United States Patent [19]
Tuchman

[11] Patent Number: 4,782,541
[45] Date of Patent: Nov. 8, 1988

[54] EARTHQUAKE PROTECTIVE BED

[76] Inventor: David C. Tuchman, 370 Mansfield St., Apartment T1, New Haven, Conn. 06511

[21] Appl. No.: 75,970

[22] Filed: Jul. 21, 1987

[51] Int. Cl.⁴ .................................................. A47C 29/00
[52] U.S. Cl. ................................................. 5/414; 5/424; 403/2; 403/166; 52/167
[58] Field of Search ............... 5/414, 415, 416, 424, 5/425, 9 R, 9 B, 11, 2 R; 52/167, 98; 403/2, 166

[56] References Cited

U.S. PATENT DOCUMENTS

| | | | |
|---|---|---|---|
| 421,656 | 2/1890 | Blanken | 5/425 |
| 468,186 | 2/1892 | Beardsley | 52/167 |
| 2,597,800 | 5/1952 | Hussman | 52/167 |
| 3,932,903 | 1/1976 | Adams et al. | 5/100 |
| 4,069,527 | 1/1978 | Harris | 5/414 |
| 4,214,326 | 7/1980 | Spann | 4/424 |
| 4,281,487 | 8/1981 | Koller | 52/167 |
| 4,490,864 | 1/1985 | Wicker, Jr. | 5/9 R |
| 4,527,365 | 7/1985 | Yoshizawa et al. | 52/167 |
| 4,565,039 | 1/1986 | Oguru et al. | 52/167 |
| 4,599,834 | 7/1986 | Fujimoto et al. | 52/167 |

FOREIGN PATENT DOCUMENTS 675982 12/1963 Canada .................................. 52/167
2254974 12/1973 France .................................. 52/167

Primary Examiner—Alexander Grosz
Assistant Examiner—Eric K. Nicholson
Attorney, Agent, or Firm—Lilling & Greenspan

[57] ABSTRACT

A protective bed suitable for protecting an occupant or occupants during major catastrophies resulting in falling debris includes a canopy made of steel mesh which is resistant to penetration by and accumulation of falling debris. The canopy covers the lower section of the bed. The canopy is supported by telescoping tubes with compression springs therein arranged to permit the canopy to remain in a noraml upper or raised position and to drop to a lower position with attendant compression of the spring to convert or absorb the energy of the falling debris, thereby minimizing damage to the bed structure and maximizing the degree of safety to the occupant or occupants of the bed. A padded guard rail extends about the periphery of the bed to prevent ejection of the occupant or occupants during violent movements of the bed, as might occur during an earthquake or tornado. Selected portions of the bed, including the canopy, the telescoping tubes, etc. can be covered with decorative materials, such as fabric, to render the functional protective structure asethetically pleasing.

20 Claims, 1 Drawing Sheet

EARTHQUAKE PROTECTIVE BED

BACKGROUND OF THE INVENTION

1. Field of The Invention

This invention relates to beds, and more specifically to a bed which provides protection to the user or occupant from falling debris, such as during an earthquake.

2. Background of The Invention

Numerous catastrophes due to natural causes as well as those caused by man, such as earthquakes, tornadoes, explosives, and the like, can all damage dwellings with attendant deterioration of the structures. Under such conditions, an occupant of a dwelling is frequently exposed to falling debris when ceilings and upper floors deteriorate and fully or partially collapse The possibility of danger or even death to occupants of such dwellings is very real, particularly when the catastrophe occurs during the night while occupants are asleep and there is no advance warning to permit evacuation of the dwelling. In certain regions of the world where earthquakes and tornadoes are more common, numerous injuries and deaths can and do occur when residents are asleep. While housing structures in such regions are generally specially designed and reinforced to be more resistant to damage and collapse, substantial damage can nevertheless occur, particulraly when the catastrophes are intense Canopy beds of various designs have been known for many years. However, the use of canopies on beds has conventionally been used for decorative or ornamental purposes and not to provide protection to the occupant(s) of the bed. Such canopies are generally flimsy in construction and are not intended to experience substantial stresses from falling debris. Accordingly, such known canopies are typically only made of wood frames covered with decorative fabrics and materials and would give little, if any, protection from falling debris.

Accordingly, it is an object of the present invention to provide a bed which provides the occupant or occupants thereof with protection from falling debris.

It is another object of the present invention to provide a bed of the type aforementioned, which provides a refuge to the occupant or occupants of the bed in those instances where the persons are unable to safely evacuate their home.

It is a further object of the present invention to provide a bed of the type under discussion which can absorb the impact of falling debris without damage, rendering the bed reuseable.

In order to achieve the above object, as well as others which will become apparent hereafter, a protective bed in accordance with the present invention comprises a lower section which forms a base suitable for supporting a mattress. An upper section is arranged above and substantially covers the lower section. Interconnecting means are provided for maintaining said upper and lower sections spaced at least a predetermined distance from each other to define an occupant space. Said upper section is resistant to penetration by falling debris. In this manner, an occupant within the occupant space is shielded between such upper and lower sections and protected from impact of falling debris, such as during an earthquake.

According to a presently preferred embodiment of the invention, the bed consists of frame made of heavy steel tubing, with the upper section defining a surface which fully covers the lower section and is made of a metallic mesh which can resist impact and substantial accumulation of debris. Said upper section is mounted on telescoping tubes which permits the upper section from moving from a normally upper or raised position to a lower position which defines a predetermined distance between the upper and lower sections to define a minimum occupant space. Advantageously, means are provided within the telescoping tubes to convert or absorb the energy of the falling debris as as to insure minimal damage to the bed structure and maximize the safety to the occupants thereof.

According to another feature of the present invention, there is advantageously provided padded or cushioned railings about the periphery of the bed to prevent ejection of the occupant or occupants thereof during violent movements of the bed, thereby maintaining the occupant or occupants within the safe environment of the occupant space.

Although the bed in accordance with the invention is highly functional and practical, selected portions thereof may be covered with ornamental or decorative materials, such as fabric, to render the bed esthetically pleasing.

BRIEF DESCRIPTION OF THE DRAWINGS

The invention will now be described by way of example in connection with a presently preferred embodiment, in which reference will be made to the accompanying drawings, in which.

DESCRIPTION OF THE PREFERRED EMBODIMENT

Figure 1:
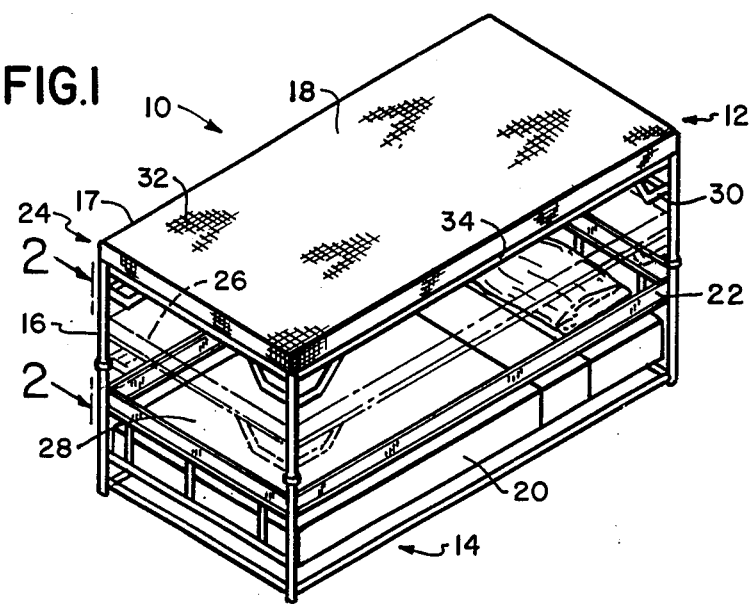
FIG. 1 is a perspective view of a protective bed in accordance with the present invention, showing the upper section or protective canopy in a normal upper position (solid outline) and in a lower position (phantom outline)

Referring now specifically to the Figures, wherein the identical or similar parts are designated by the same reference numerals throughout, and first referring to FIG. 1, a protective bed in accordance with the present invention is geherally designated by the numeral reference 10.

The bed 10 includes a upper section 12, a lower section 14 and interconnecting support posts or members 16 which support the upper section 12 above the lower section 14 as shown.

The upper section 12 is in the nature of a canopy 17 which is advantageously formed of metal, such as metal mesh or grating 18. An important feature of the present invention is that the upper section 12 is formed of a material and constructed to be resistant to penetration by falling debris, of the type that may be expected during the collapse or partial collapse of a building structure as may be encountered during a natural disaster such as an earthquake or a tornado.

The lower section 14 forms a base suitable for supporting a mattress 20. The mattress may be either a conventional spring mattress, or an air or water mattress. The specific construction details of the bed 10 and the specific materials used for the construction are not critical, as long as the construction and materials are such as to provide the requisite protection, as will become evident from the disclosure that follows. In the presently preferred embodiment however, the bed 10 is manufactured from heavy grade steel tubing.

In accordance with one feature of the invention, there is provided a guard rail 22 which extends at least partially about the periphery of the lower section 14 to prevent an occupant or occupants from being ejected from the bed 10 with violent movements thereof, such as during an earthquake.

In FIG. 1, the upper section 12 is shown in its normal upper position 24 (solid outline) and in a lower position 26 (phantom outline). The space between the upper and lower sections 12, 14, respectively, is designated as an occupant space 28 which represents the region which provides protection to the occupant or occupants. The supporting posts or telescoping tubes 16 maintain the upper and lower sections 12, 14, respectively, spaced at least a predetermined distance from each other, even in the lower position 26 of the upper section 12, so that the occupant space 28 provides a sufficient and adequate space to the occupant or occupants irrespective of the position of the upper section 12. A minimum height ($d_2$ in FIG. 3) of approximately two feet is preferable. However, a one foot safety clearance could also provide a degree of protection.

If desired, optional reinforcement braces 30 can be provided which further reinforce and strengthen the tubural frame which forms the protective bed 10. Clearly, the protective bed 10 can be strengthened and reinforced by selecting heavier grades of tubing and reinforcing the interconnected members at critical points. However, such modifications or variations of the bed would all achieve the same or similar goals, with different degrees of advantage.

While certain objects of the invention can be achieved by providing an upper portion 12 which is smaller than the lower section 14 and, therefore, does not cover the entire lower section, in accordance with the presently preferred embodiment, the canopy 17 covers the entire lower section 14 to provide optimum protection to the occupants of the space 28.

Figures 2, 3:
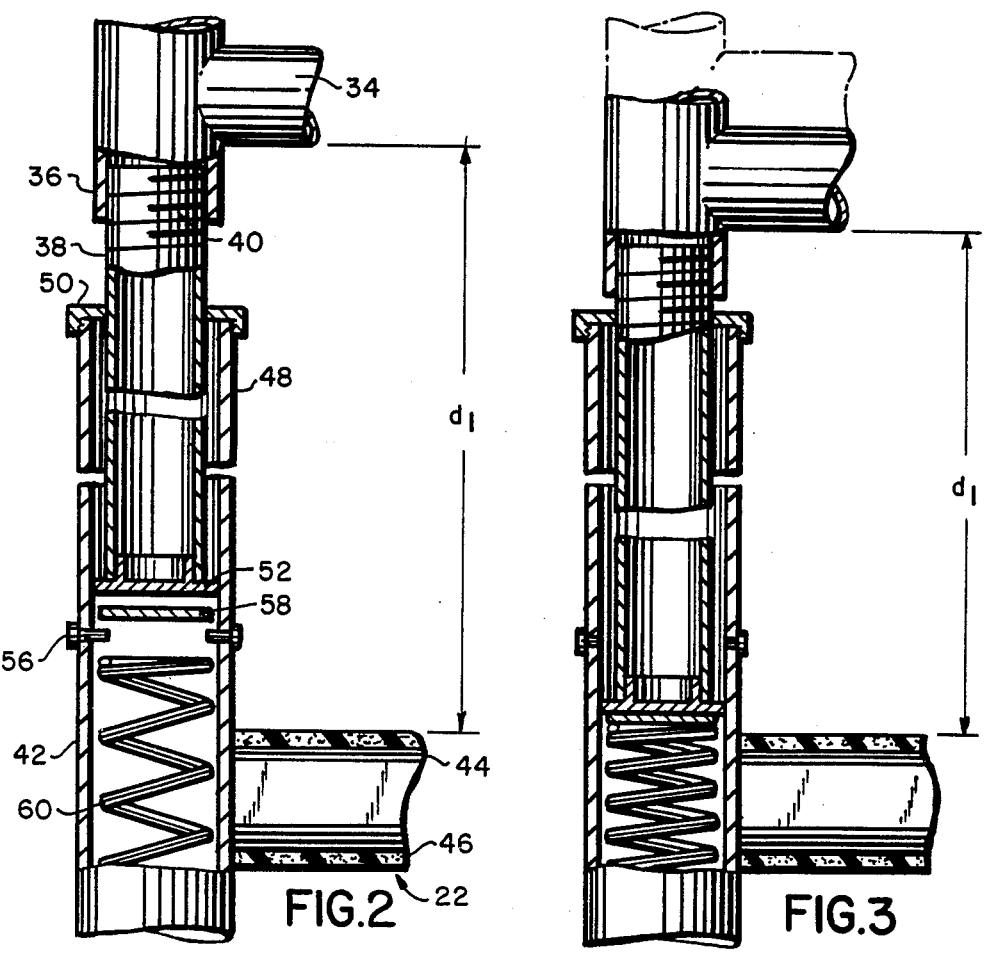
FIG. 2 is an enlarged side elevational view, partially in cross section, taken through line 2—2 in FIG. 1, showing the details of the telescoping tubes which support the upper section, shown in the normal upper or raised position, and also showing a compression spring within the telescoping tubes which serves as an energy conversion or absortion device for minimizing damage to the bed structure.
FIG. 3 is similar to FIG. 2, but showing the telescoping tubes in a collapsed condition and the spring in a compressed condition as would occur after debris has impacted upon and accumulated on the upper section of the bed.

Referring to FIG. 2, the frame structure for the protective bed 10 is formed of tubular sections which are preferably made of steel or other metallic or strong material.

In accordance with the presently preferred embodiment, the interconnecting tubes 16 are in the nature of a plurality of telescoping tubes, one at each corner of the bed 10, which extend between the upper and lower sections 12, 14, respectively, for enabling movement of the upper section 12 between upper and lower positions 24, 26, respectively, as above noted. In the normal position (distance $d_1$ in FIG. 2), the upper section 12 is in the uppermost position, but moves to the lower position 26 (distance $d_2$ in FIG. 3) in response to the weight of the debris accumulated on the upper section 12, namely the canopy 17.

A canopy support bar 34 is connected to an upper pipe or tube 36 which forms part of the canopy 17. A middle pipe or tube 38 has a smaller diameter than the upper pipe 36 and is fixedly connected thereto in any conventional manner. In FIG. 2, such connection is shown to be by means of a threaded section 40. The middle pipe 38 extends downwardly towards the lower section 14 and engages a lower pipe 42 which forms part of the lower section 14. Also shown in FIG. 2 is the guard rail 22, which is shown in section to comprise a hollow tube 44 covered with a soft cushion or padding material 46. In the presently preferred embodiment, the cushion 46 is in the nature of a detachable padded cover which may be made of a high density foam material. The guard rail 44 can be formed of either a hollow tube, as shown, or may comprise a solid bar.

In the embodiment shown, the middle and lower pipes 38, 42, respectfully, are hollow tubes. The middle pipe 38 has an outside diameter which is smaller than the inside diameter of the lower pipe 42 so as to provide a clearance or a space 48 between the telescoping tubes. This allows the middle pipe or tube 38 to move freely within the lower pipe 42 to thereby facilitate collapse of the telescoping tubes. In order to maintain alignment and prevent relative lateral movements between the pipes or tubes 38, 42, there is advantageously provided alignment members, which in FIGS. 2 and 3 are shown to consist of a riser cap plate or screw on flange 50 and an expansion or sliding ring 52. The cap 50 is threadedly secured to the top of the lower pipe 42 and is provided with an opening which is dimensioned to receive the middle pipe 38 with little or no clearance. Similarly, the sliding ring 52 is attached to the bottom of the middle pipe or tube 38, in any conventional manner, and has a diameter which substantially corresponds to the inner diameter of the lower pipe or tube 42 so that the sliding ring 52 is mounted for sliding movement within the lower pipe with little or no clearance. It will be appreciated that the use of cap 50 and ring 52 maintain the pipes and tubes 38, 42 in coaxial alignment with each other and lateral movement between same is prevented.

An important feature of the present invention is the provision of frangible members 56 which may be in the nature of notched breakaway bolts which penetrate through the wall of the lower pipe 42, as shown, and engage the lower end of the middle pipe or tube 38 and maintain the upper section 12 in the upper position 24. The characteristics of the notched breakaway bolts 56 are such that they will not break when supporting the basic weight of the upper section 12. However, when debris impacts against the canopy 17 and accumulates thereon, a point is reached where the total resulting weight of the canopy 17 and the debris create a force sufficient to break the notched bolts 56, and the middle pipe 38 is permitted to move downwardly in telescoping relationship to the lower pipe 42. In this connection, a stop plate 58 may be used which is interposed between the sliding ring 52 and the notched bolts 56 which supports the middle pipe or tube 38 until collapse of the tubes takes place, at which time the stop plate 58 moves downwardly, as shown in FIG. 3.

An important feature of the present invention is the provision of energy conversion means for dissipating the energy of the falling debris to thereby minimize damage to the bed and maximize the safety to the occupant or occupants thereof. The falling debris represents kinetic energy which, together with the weight of the debris which has accumulated on the canopy 17, creates a shearing force on the notched breakaway bolts 56. However, as soon as the bolts 56 break, the middle pipes or tubes 38, together with the supported superstructure or upper section 12 would normally fall freely until full collapse of the telescoping sections has taken place. However, because substantial forces may be involved, final impact (for example, when the canopy support bars 34 impact against the upper ends of lower pipes 42) could create deformation and damage to the overall structure. In order to eliminate this possibility, an energy conversion or absorbing device is shown in the nature of a compression spring 60 which is housed within the lower pipe 42, and can extend between the notched bolts 56 and the ground or the lowermost ends of the lower pipes 42. As is shown in FIG. 3, once the notched bolts 56 break and the upper section 12 moves to its lower position 26, the stop plate 58 engages the compression spring 60 and compresses same. During such compression, the spring absorbs the energy of the moving parts and reduces the stresses imparted to the bed frame structure. In this connection, where no sliding ring 52 is provided, the stop plate 58 may also serve to stop the spring 60 from entering through the open end of the middle pipe or tube 38. Thus, the stop plate 58 would, in that event, ensure compression of the spring 60.

In place of compression spring 60, any other energy conversion or absorption devices can be used, including hydraulic or pneumatic means. Friction can also be used to dissipate some of the energy created during the downward movement of the upper section 12. Thus, for example, if the dimensions are so selected that there is frictional engagement between the cap 50 and the middle pipe or tube 38 and/or the sliding ring 52 and the inner surface of the lower pipe or tube 42, friction will necessarily result during relative axial movements of the middle and lower pipes or tubes 38 and 42. The degree to which energy conversion or absorption devices that will be required will, of course, be a function of the weight of the upper section 12 as well as the amount of debris which is contemplated that could deposit on the canopy 17. Also, the overall strength of the tubural members will be an important consideration. The selection of appropriate energy conversion or asborption means for given conditions of use will be evidence to those skilled in the art.

In accordance with another feature of the invention, selected surface portions of the protective bed 10 can be covered with fabric or other decorative materials so as to provide an aesthetically pleasing product. Thus, matching fabrics or other finishing materials can be applied to the upper section 12, the lower section 14, and/or the interconnecting or telescoping tubes 16. The uses of such decorative finishing materials is, of course, a matter of individual taste.

Thus, it will be seen that the bed in accordance with the present invention provides an occupant or occupants with protection against falling debris, as well as serve as a refuge in case safe evacuation, in the event of natural or man-caused catastrophes, is impossible. Once the catastrophe has subsided, persons can exit the occupant space or compartment or remain to await rescue. In this connection, the bed 10 may be outfitted with additional safety/survival gear including, but not limited to, plastic water bottles, packaged food stuffs, first aid kit, fire resistant blanket, emergency transponder, two-way battery powered radio, and the like.

When enough debris is removed from the canopy 17, the top section will automatically be raised and returned to the upper position 24 as a result of the expansion of the compression spring 60. At such time, a new notched bolts 56 can be inserted through the wall of the lower pipe or tube 42, so that the bed 10 is again placed in the condiction that it was prior to the catastrophe and can be reused with little or no damage to the structure.

While the preferred embodiment of the invention has been shown and described herein, it will be obvious that numerous additions, changes and omissions may be made in such embodiment without departing from the spirit and scope of the invention.

I claim:

1. A protective bed comprising a lower section forming a base suitable for supporting a mattress; an upper section arranged above and substantially covering said lower section; interconnecting means for maintaining said upper and lower sections spaced at least a predetermined distance from each other to define an occupant space, said upper section being resistant to penetration by falling debris, whereby an occupant within said occupant space is shielded between said upper and lower sections and protected from impact of falling debris, such as during an earthquake, wherein said interconnecting means comprises a plurality of telescoping tubes extending between said upper and lower sections for enabling movement of said upper section between upper and lower positions relative to said lower section, said upper section normally being disposed in said upper position and moving to said lower position in response to the weight of debris accumulated on said upper section; and maintaining means for maintaining said upper section in said upper position prior to impact by and accumulation of debris on said upper section, and wherein said maintaining means comprises frangible members which extend through at least one tube of each set of telescoping tubes which prevent collapse of said telescoping tubes prior to accumulation of debris on said upper section and resulting fraction of said frangible members.

2. A protective bed as defined in claim 1, wherein said frangible members comprise notched breakaway bolts.

3. A protective bed as defined in claim 1, wherein each telescoping tube has a large diameter tube and a smaller diameter tube arranged for sliding movement within said large diameter tube, the inner diameter of said larger diameter tube and the outer diameter of said smaller diameter tube being selected to provide a clearance between said smaller and larger diameter tubes to thereby permit free collapse of said telescoping tubes.

4. A protective bed as defined in claim 3, further comprising alignment means for maintaining said smaller and larger diameter tubes coaxial to each other and for preventing lateral movements therebetween.

5. A protective bed comprising a lower section forming a base suitable for supporting a mattress; an upper section arranged above and substantially covering said lower section; interconnecting means for maintaining said upper and lower sections spaced at least a predetermined distance from each other to define an occupant space, said upper section being resistant to penetration by falling debris, whereby an occupant within said occupant space is shielded between said upper and lower sections and protected from impact of falling debris, such as during an earthquake, and energy conversion means for dissipating the energy of falling debris and thereby minimizing damage to the bed and maximizing the safety to the occupant(s) thereof, said interconnecting means comprising a plurality of telescoping tubes extending between said upper and lower sections for enabling movement of said upper section between upper and lower positions relative to said lower section, said upper section normally being disposed in said upper position and moving to said lower position in response to the weight of debris accumulated on said upper section; and wherein said energy conversion means comprises a compression spring within said telescoping tubes which undergoes compression when said upper section moves from said upper to said lower positions, whereby said compression spring absorbs the energy of the falling debris and reduces the stresses imparted to the bed.

6. A protective bed as defined in claim 5, wherein said lower section includes guard means extending at least partially about the periphery of said lower section and arranged to prevent an occupant from being ejected from said occupant space as a result of violent movements of the bed.

7. A protective bed as defined in claim 6, wherein said guard means comprises a guard rail.

8. A protective bed as defined in claim 6, further comprising padding means covering said guard rail to prevent injury of the occupany upon impact with the guard rail.

9. A protective bed as defined in claim 8, wherein said padding means is formed of high density foam material.

10. A protective bed as defined in claim 6, wherein said guard means comprises a bar.

11. A protective bed as defined in claim 6, wherein said guard means comprises a hollow tube.

12. A protective bed as defined in claim 5, wherein said upper section is in the nature of a canopy which defines a debris intercepting surface which covers said entire lower section.

13. A protective bed as defined in claim 5, wherein said upper section is formed of metal.

14. A protective bed as defined in claim 13, wherein said upper section is formed of a metal mesh material.

15. A protective bed as defined in claim 5, wherein said interconnecting means comprises tubes.

16. A protective bed as defined in claim 15, wherein said tubes are made of metal.

17. A protective bed as defined in claim 5, wherein said telescoping tubes are hollow, and further comprising stop means for preventing said compression spring when disposed in one of the sections of a telescoping tube from entering the other associated section of the telescoping tube without compression during collapse of said telescoping tube.

18. A protective bed as defined in claim 17, wherein said associated section has an open end and wherein said stop means comprises a stop plate for blocking said open end.

19. A protective bed as defined in claim 5, wherein said interconnecting means comprises a plurality of telescoping tubes extending between said upper and lower sections for enabling movement of said upper section between upper and lower positions relative to said lower section, said upper section normally being disposed in said upper position and moving to said lower position in response to the weight of debris accumulated on said upper section; and wherein said energy conversion means comprises friction means provided within said telescoping mans for converting the energy of falling debris into heat during collapse of said telescoping means.

20. A protective bed as defined in claim 5, further comprising decorative surface means covering selected portions of at least one of said upper and lower sections and said interconnecting means.

* * * * *